United States Patent [19]

Haas et al.

[11] Patent Number: 4,631,673
[45] Date of Patent: Dec. 23, 1986

[54] METHOD FOR REFRESHING MULTICOLUMN TABLES IN A RELATIONAL DATA BASE USING MINIMAL INFORMATION

[75] Inventors: Laura M. Haas, Palo Alto; Bruce G. Lindsay, San Jose, both of Calif.

[73] Assignee: International Business Machines Corporation, Armonk, N.Y.

[21] Appl. No.: 693,500

[22] Filed: Jan. 22, 1985

[51] Int. Cl.$^4$ ............................................. G06F 15/20
[52] U.S. Cl. .................................................... 364/300
[58] Field of Search ......................................... 364/300

[56] References Cited

U.S. PATENT DOCUMENTS 4,432,057 2/1984 Daniell et al. ...................... 364/300

Primary Examiner—Raulfe B. Zache
Attorney, Agent, or Firm—R. Bruce Brodie

[57] ABSTRACT

A method for refreshing a relational data base snapshot manifest in the form of remote read-only copies of selected portions of a base table. The method takes advantage of the fact that each tuple of the base table has a unique identifier TID associated therewith from the time the record is inserted until it is deleted. The TID references the physical location of the tuple within its relation. Two system-maintained fields are added to the base table. These are PREVTID and update ID. One system-maintained column is required in the snapshot table, i.e. BASE TID. Lastly, a column in the catalog of the snapshot is also maintained, i.e. SNAPHIGH.

When the refresh of the snapshot table is required, a single scan of the base relation, in ascending TID sequence, is performed on the base table. The scan produces a series of messages which contain the incremental changes required to update the snapshot table to the current state of the base relation. Upon receipt of the messages at the snapshot table site, a single skip sequential pass across the snapshot in BASE TID sequence is performed to apply the incremental changes. This refreshes the snapshot table to the required state.

3 Claims, 4 Drawing Figures

```
This is the procedure followed at the base table site, after receiving
the value SNAP_HIGH with a refresh request from the snapshot site.

delete = 0;
last_tid = 0;
expect_last = 0;
last_in_snapshot = 0;
open_segment_scan(base_relation);

forever do;
                                    /* scan the base table in tid order */
    next = fetch_next_record;
    if end_of_scan then break;
    new_expect = next.tid;

if next.prev = NULL
        then do;  /* this is a record inserted since last refresh of any */
                  /* snapshot on this table.                              */
            newid = get_new_uid;
            next.uid = newid;
            next.prev = last_tid;
            update_record(next);
            new_expect = expect_last;  /* inserted tuple doesn't change  */
                                       /* our expectations, so restore   */
        end;   /* of inserted record */ elseif next.prev ¬= expect_last
        then do;   /* there have been one or more records deleted */
            newid = get_new_uid;
            next.uid = newid;
            delete = max(newid,delete);
            next.prev = last_tid;
            update_record(next);
        end;   /* of deleted run */ elseif next.prev ¬= last_tid
        then do;   /* fix prev reference due to insertion */
            next.prev = last_tid;
            update_record(next);
        end;

if next.uid = NULL
        then do;   /* record updated since last refresh scan */
            newid = get_new_uid;
            next.uid = newid;
            update_record(next);
            delete = max(newid,delete);
        end;   /* updated record */
```

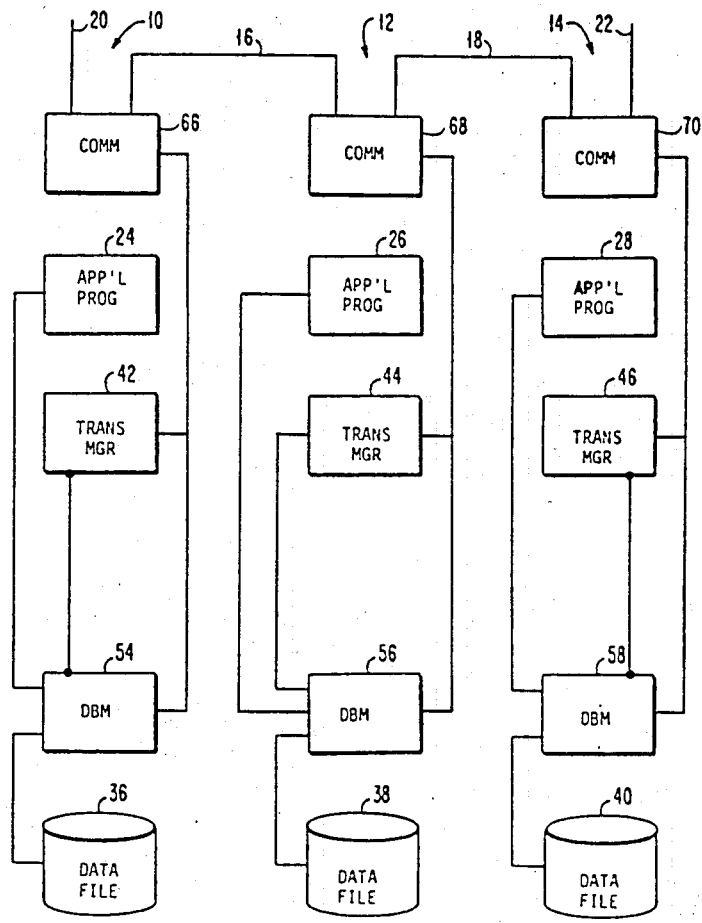
(PRIOR ART) FIG. 1

```
     This is the procedure followed at the base table site, after receiving
the value SNAP_HIGH with a refresh request from the snapshot site.

delete = 0;
last_tid = 0;
expect_last = 0;
last_in_snapshot = 0;
open_segment_scan(base_relation);

forever do;
                            /* scan the base table in tid order */
  next = fetch_next_record;
  if end_of_scan then break;
  new_expect = next.tid;

if next.prev = NULL
    then do;   /* this is a record inserted since last refresh of any */
               /* snapshot on this table.                             */
      newid = get_new_uid;
      next.uid = newid;
      next.prev = last_tid;
      update_record(next);
      new_expect = expect_last;   /* inserted tuple doesn't change */
                                  /* our expectations, so restore  */
    end;   /* of inserted record */ elseif next.prev ¬= expect_last
    then do;   /* there have been one or more records deleted */
      newid = get_new_uid;
      next.uid = newid;
      delete = max(newid,delete);
      next.prev = last_tid;
      update_record(next);
    end;   /* of deleted run */ elseif next.prev ¬= last_tid
      then do;   /* fix prev reference due to insertion */
        next.prev = last_tid;
        update_record(next);
      end;

if next.uid = NULL
    then do;   /* record updated since last refresh scan */
      newid = get_new_uid;
      next.uid = newid;
      update_record(next);
      delete = max(newid,delete);
    end;   /* updated record */
```

FIG. 2A

```
if next.user_fields in snapshot   /* i.e. not projected out */
  then do;
    if next.uid > snap_high | delete > 0 then
      do;
            /* this record has been inserted, or updated since last */
            /* refresh of the currently being updated snapshot, or  */
            /* some records were deleted before this record.        */
        xmit(next.user_fields, next.tid, last_in_snapshot,
            max(delete,next.uid));
        delete = 0;
      end;
    last_in_snapshot = next.tid;
  end;   /* of snapshot record */
else
      /* this record is not in the snapshot. If this record has  */
      /* been modified and the modification detected since the   */
      /* last refresh of this snapshot (uid > snap_high) some    */
      /* records may need to be deleted from this snapshot. To be */
      /* safe, must set delete on.                               */
  if next.uid > snap_high then delete = max(next.uid,delete);

last_tid = next.tid;
  expect_last = new_expect;

end;   /* of do forever */ xmit(*, *, last_in_snapshot, *);   /* may need deletes at end of snapshot */
```

FIG. 2B

The following is the code executed at the snapshot site.

```
max_uid = max_from_catalog;
send max_uid with request for refresh to snapshot site;
for each received tuple do;
  /* tuple = <user_fields, basetid, prev_tid, uid> */
  delete record from snapshot
    where tuple.prev_tid < record.basetid
      and record.basetid < tuple.basetid;
  if exists record in snapshot where record.basetid = tuple.basetid
    then do;
      if record.user_fields ¬= tuple.user_fields
        then update snapshot set record.user_fields = tuple.user_fields;
    end;   /* snapshot record updated */
  else insert into snapshot <tuple.user_fields, tuple.basetid>;
  max_uid = max(max_uid, tuple.uid);
end;   /* for all received tuples */
max_from_catalog = max_uid;
```

FIG. 3

METHOD FOR REFRESHING MULTICOLUMN TABLES IN A RELATIONAL DATA BASE USING MINIMAL INFORMATION

TECHNICAL FIELD

This invention relates to a method for updating an extensible multicolumn table which is a subset or snapshot of a logically independent extensible multicolumn or base table in a distributed relational data base system. More particularly, the method relates to the propagation of changes in which the snapshot table is periodically made to match the contents of the base table.

BACKGROUND

As pointed out by C. J. Date, "A Guide to DB2", Addison-Wesley Publishing Co., 1984, at page 7 thereof, "A relational data base is a data base that is perceived by its users as a collection of tables and nothing but tables". In this regard, Adiba and Lindsay, "Data Base Snapshots", IBM Research Report RJ 2772, Mar. 7, 1980, noted that relational data base management systems provide an interface permitting users and application software to access the contents of a time-varying set of relations or tables. Such a management system returns or updates the current value of records selected by query language statements. These statements are either embedded in application software or are supplied by a user directly. Adiba points out that not only can users interrogate and modify records in the current data base state, but they can also insert new records and remove existing ones. Such systems also permit users to create new relations, extend the attribute set of existing relations, and destroy relations no longer needed.

One drawback of contemporary systems is that users can only operate upon the latest data base state even though applications may require or tolerate access to earlier versions of the data base. Read-only access to earlier "snapshots" of selected portions of a data base would permit such applications to view the data base "as of" a specific time without having to execute at that specific time. Also, if snapshots are not affected by updates to the "current" data base, they can be used to make selected portions of the data base "stand still" for complex applications processing without delaying update processing on a current data base state.

Adiba et al, in the remainder of their document, described the creation of a logically independent multicolumn table derived from a larger table and representing an information state frozen in time. This is the "snapshot".

For purposes of completeness, reference should be made to Daniell et al, U.S. Pat. No. 4,432,057, "Method for the Dynamic Replication of Data Under Distributed System Control to Control Utilization of Resources in a Multiprocessing Distributed Data Base System", issued Feb. 14, 1984. This reference relates to accessing copies of a table distributed among networked nodes without requiring concurrent (synchronized) updating by revising any local table with remote versions of the table as a function of node identity and time stamp ordering.

THE INVENTION

For purposes of this invention, a "snapshot" is defined as being a read-only copy of some portion of a single table, known heretofore as a source or base table. The snapshot is a frozen copy of the base table. That is, it does not constantly reflect changes to the base table as a true replica would. A snapshot can, however, be refreshed periodically so that its contents reflect all changes to the base table since the snapshot creation or the last refresh. It is accordingly an object of this invention to devise a method for minimizing the amount of data transmitted to refresh the snapshot, especially where the snapshot and base table are physically dispersed.

This object is satisfied by a method in which both the snapshot and the base table are scanned in the same order, and extra fields in the base table permit the method to keep track of where a change has occured since the last refresh of a particular snapshot as well as identifying the type of change; that is, whether a change was an insert, an update, or a deletion. The advance in terms of method steps includes (a) defining on the base table a partial ordering of time stamps on the row updates, a total ordering of row entry identifiers, and a backward chaining of the identifiers of adjacent row entries; (b) scanning the base table and detecting updates as anomalies to the orderings or chaining; and (c) communicating the updates and altering the snapshot table thereby.

The invention involves the unexpected observation that a combination of total and partial orderings and chainings could be related to a minimal information representation of said table changes by way of column extensions, scanning, and detecting ordering or chaining anomalies.

Since the invention in part relies upon information in designated columns assuming certain ordering properties, such orderings should be defined. For example, the time stamps are partially ordered on the row updates. A partial ordering is exemplified by the "less than or equal to" relation defined on real numbers. The total ordering of row entry identifiers is exemplified by the "less than" relation defined on real numbers. Backward chaining is that property of a linked list such that as one goes down a column from top to bottom, the values in any given field constitute a pointer defining the address of a predecessor to a given entry. Insertions, deletions, or modifications of table entries disturb these orderings which are detected when the table is scanned. The skip sequential pass used for updating the snapshot table is in the form of an index sequential scan.

BRIEF DESCRIPTION OF THE DRAWING

FIG. 1 depicts data storage, processing, and communication resources in a representative configuration of nodes in a distributed data base and multiprocessng-/multiprogramming system.

FIGS. 2a and 2b and 3 depict a pseudocode representation of the base table and snapshot table site processing, the high-level language object code equivalent being executable on a system shown in FIG. 1.

DESCRIPTION OF THE PREFERRED EMBODIMENT AND INDUSTRIAL APPLICABILITY

The Environment

Referring now to FIG. 1, there is shown a distributed system having three nodes 10, 12, 14 interconnected by communication links 16, 18 and by links 20, 22 to other nodes in said distributed data base, multiprocessing, multiprogramming system. Every node 10, 12, 14, etc., has the capability of storing data items in data files 36, 38, 40. Copies of data items are dynamically created at a node as required to support the processing which occurs at that node. Physically, a node may be a general purpose computer, or central electronic complex such as an IBM System/360 or 370, described in Amdahl et al, U.S. Pat. No. 3,400,371; and in IBM System/370 Principles of Operation, IBM Publication GA22-7000-6.

A state-of-the-art relational data base management system which may be used for practicing the invention includes IBM Data Base 2, hereafter referred to as DB2. DB2 runs as a subsystem in the IBM Multiple Virtual Storage/370 (MVS/370) DB2 as described in IBM Data Base 2 General Information Manual, GC26-4073-1, Second Edition, July 1984. Of significance is the fact that DB2 uses a relational data model. In this regard, tables are the basic data structure. In such relational systems, all data are represented in a simple tabular multicolumn format. Such systems permit the defining of additional structures on the tables to meet specific needs.

Aspects of Relational Data Base

A table in a relational system consists of a row of column headings, together with zero or more rows of data values. For a given table, the row of column headings specifies a data type for the data entries in that column. Further, each data row contains exactly one data value for each of the columns specified in the row of column headings. The rows of a relational table are considered to be unordered. An ordering can be imposed on the rows when they are retrieved in response to a query. In contrast, the columns of the table are considered to be ordered left to right. A base or source table is an autonomous, named table. That is, the table exists in its own right. It is contrast with a view which does not exist in its own right, but is derived from one or more base tables.

In a contemporary relational data base system such as DB2, it is possible to create and load just a few base tables and then start using that data immediately. Later, new base tables and new fields can be added in piecemeal fashion, without having any affect on existing users of the data base. For details with reference to the creation, manipulation, and extraction of data in a relational data base, reference should be made to the aforementioned C. J. Date, "A Guide to DB2", especially chapters 3-8.

The Refresh Method

The method of this invention assumes that every record in a relation has associated therewith a unique identifier, or tuple ID (TID). It further assumes that a relation can be scanned efficiently in TID order. Further note that the tuple ID associated with a record may be assigned to another record after the first record has been deleted from the data base (i.e. TID's can be reused). Also, each record of the base table is assumed to consist of a predetermined number of columns defined by the user (USER FIELDS) and two additional system-defined columns. The system-defined columns are PREVTID and UID. In this regard, PREVTID is the tuple identifier (TID) of the record before a given record in the base table. Relatedly, UID is a "time stamp" which corresponds to the time of the last alteration of the record. As should be recalled, the invention involves the periodic updating of a snapshot of a base table using a minimum amount of information. The advance involved is defining additional columns on the base table and the orderings of the information therein.

Each record of the snapshot itself is a subset of the user fields of the base table record. The snapshot table includes one additional system-defined column giving the TID of the corresponding record in the base table (BASE TID). Thus, it is possible to access the snapshot efficiently in BASE TID order. This may be accomplished by way of a clustered link or index.

The base table is maintained by normal user applications. The extra columns of the base table are used by the refresh method. If both extra columns are null, then the record has been inserted since the last refresh. If the UID column alone is null, then the record has been updated since the last refresh. If PREVTID does not contain the TID of the previous record, but does contain a valid TID, then some deletes or inserts must have occurred before this record.

At refresh, the snapshot site (or node) sends a request containing a value SNAPHIGH to the base table site or node. This value is the highest UID the snapshot site has seen or any record received from the base table site during any previous refresh of the snapshot. In response, the base table site constructs a sequence of messages consisting of a number of tuples of the form:

$$<\text{user fields}>, <\text{base table TID}>, <\text{previous TID in snapshot}>, <\text{UID}>.$$

As used above, <user fields> are those fields of the base table used by the snapshot, <base table TID> is the TID corresponding to the user fields of this record in the base table, <previous TID in snapshot> is the TID of the last record in the base table which also appears in the snapshot, and <UID> is the value of that column for this record in the base table.

A base table record appears in the message to be sent to the snapshot site if (1) the record belongs in the snapshot; and (2) it either has a UID greater than the highest UID seen before at the snapshot site, or it is likely that some deletes may have occurred before this record since the last refresh of this snapshot.

The steps of the method executable at the base table site involve sequencing through the base table in TID order. For each record, determine whether that record has been either inserted or updated, and whether there have been any records deleted directly in front of this one. In any of these cases (insert, update, delete), assign to this record a new high UID larger than any used before this refresh time. If the record has been updated or records have been deleted before this record, set the delete flag on. This is to show that records may have been deleted from the snapshot. Parenthetically, updates to a base table relation may translate into a delete from the snapshot because the record no longer meets the criteria for snapshot membership. The next step involves fixing the PREVTID field if it is incorrect and then ascertaining whether to send the record. That is, does the record belong in the snapshot? If so, is the record's UID higher than SNAPHIGH, or is the delete flag on? If the UID is higher or the delete flag is on, then the record is added to the message.

At the snapshot site, a message received from the base table site is processed record by record. For each tuple in the message, the method steps first delete all records in the snapshot whose BASE TID field falls between the <previous TID in snapshot> and <base table TID> in the message tuple. Thus, if this tuple is already present in the snapshot, its user fields are updated if they have changed. If the tuple does not exist, it is inserted in the snapshot.

Referring now to FIGS. 2 and 3, there is depicted a pseudocode representation of the base table and snapshot table site processing of selected steps in the method of this invention. More particularly, in FIG. 2, there is shown the procedure flow at the base table site responsive to a request to update the snapshot table. This involves scanning the base table in ascending TID order and detecting incremental changes such as brought about by row inserton, deletion, or modification. Changes will be detected in terms of the changes in the ordering of the TID or TS values for alteration in the backward chaining of PREVTID. The scanning at the base table site requires no more than a set of nested conditional statements of the "if then else" type testing whether any ordering or chaining anomalies have occurred. This single scan of the base table in ascending TID sequence results in the identification of the changes which are then communicated to the snapshot site.

Referring now to FIG. 3, there is shown the code executed at the snapshot site. In this regard, a single skip sequential pass across the snapshot in BASE TID sequence is performed in order to apply the incremental changes. This refreshes the snapshot to the required state. This skip sequential pass can be made even more efficient by use of a clustering index on the BASE TID.

Illustrative Examples

The following extended example illustrates the manner by which the method maintains the state of the base table, computes the messages, and how the messages are applied to the snapshot table. For purposes of the example, the base table is composed of two data columns or fields and two control columns or fields. The data columns or fields of the base table are NAME and LOC. These denote a person's name and work location. The control columns or fields of the base table are PREV and TIME. These stand for the address of the previous record in the base table and the time at which the base table was updated pursuant to the running of the method of this invention. In this example, two snapshot tables are used. These are respectively denominated SINKALL and SINKSJ. The snapshot tables each include two data columns or fields corresponding to columns or fields in the base table and one control column or field. The columns or fields are labeled NAME, LOC, and ADDR. The last column or field stands for the address of the corresponding base table record. The SINKALL snapshot table will be updated to match the entire contents of the base table, while the SINKSJ snapshot table will be updated to match the subset of the base table corresponding to those records in the base table where LOC="SJ".

In the following figures, the following abbreviations will be used to indicate the reasons for the actions taken by the algorithm:

| Reasons for Base Table Updates |
|---|
| SU1→ base table record inserted since last base table refresh (PREV = null) |
| SU2→ one or more preceding records deleted since last base table refresh (PREV = expected PREV) |
| SU3→ insertion before current record since last base table refresh (PREV = actual previous) |
| SU4→ record updated since last base table refresh (PREV = null & TIME = null) |

| Reasons for Transmitting Change to Snapshot Tables (either SINKALL or SINKSJ) |
|---|
| TC1→ record changed since last refresh of snapshot and record is in the snapshot restriction (TIME > SINK time) |
| TC2→ deletion in base table detected (unknown whether snapshot affected) |
| TC3→ end of table at base table and must indicate last record known to be in the snapshot to reflect deletions at the end of the base table |

| Reasons for Applying Change to Snapshot Tables (SINKALL or SINKSJ) |
|---|
| CS1→ must delete snapshot record |
| CS2→ must update snapshot record |
| CS3→ must insert snapshot record |

The following figure describes the initial state of the base table, with records at the indicated address having the indicated values:

| Base Table at time T0 | | | | |
|---|---|---|---|---|
| addr | NAME | LOC | PREV | TIME |
| 10 | Bruce | SJ | — | — |
| 20 | Bob | NY | — | — |
| 30 | Laura | SJ | — | — |
| 40 | Mohan | NY | — | — |

Next, let the SINKALL snapshot table be updated at time T1 using the inventive method. The previous refresh time for the SINKALL table will be T0.

The following describe (1) the actions and reasons for actions at the base table, and (2) the actions and reasons for actions at the snapshot table. The format of the change record sent to the snapshot table is represented as follows:

Xmit(<'values of 'normal' fields of snapshot record'>,
base table address of this record,
base table address of previous record in the snapshot table)

Refresh of SINKALL
Time of refresh = T1
Last Refresh of SINKALL = T0

| | Base Table Before Refresh | | | | Base Table After Refresh | | | |
|---|---|---|---|---|---|---|---|---|
| addr | NAME | LOC | PREV | TIME | NAME | LOC | PREV | TIME |
| 10 | Bruce | SJ | — | — | →SU1→ Bruce | SJ | 0 | T1 |
| | TC1 → Xmit(<Bruce,SJ>, 10, 0) | | | | | | | |
| 20 | Bob | NY | — | — | →SU1→ Bob | NY | 10 | T1 |
| | TC1 → Xmit(<Bob,NY>, 20, 10) | | | | | | | |
| 30 | Laura | SJ | — | — | →SU1→ Laura | SJ | 20 | T1 |
| | TC1 → Xmit(<Laura,SJ>, 30, 20) | | | | | | | |

-continued

| | | | Xmit(<'values of 'normal' fields of snapshot record'>, base table address of this record, base table address of previous record in the snapshot table) | | | | |
|---|---|---|---|---|---|---|---|
| 40 | Mohan | NY | — | — | →SU1→ Mohan | NY | 30 | T1 |
| | | | TC1 & TC3 → Xmit(<Mohan,NY>, 40, 30) | | | | |

| SINKALL Before Refresh | | | | SINKALL After Refresh | | |
|---|---|---|---|---|---|---|
| NAME | LOC | ADDR | | NAME | LOC | ADDR |
| | | | Recv(<Bruce,SJ>, 10, 0) | | | |
| — | — | — | → CS3 → | Bruce | SJ | 10 |
| | | | Recv(<Bob,NY>, 20, 10) | | | |
| — | — | — | → CS3 → | Bob | NY | 20 |
| | | | Recv(<Laura,SJ>, 30, 20) | | | |
| — | — | — | → CS3 → | Laura | SJ | 30 |
| | | | Recv(<Mohan,NY>, 40, 30) | | | |
| — | — | — | → CS3 → | Mohan | NY | 40 |

Next, let the SINKSJ table be updated using the inventive method. The time of the refresh will be T2 while the time of last refresh for SINKSJ is T0. Note that no updates are made to the base table because there have been no base table updates since the last execution of the refresh method. Note, also, that only records which appear in the restricted SINKSJ are transmitted and that the transmitted "last in snapshot table" value is adjusted accordingly.

The contents of the base table will now be as follows:

| Base Table at time T3 | | | | |
|---|---|---|---|---|
| addr | NAME | LOC | PREV | TIME |
| 10 | Bruce | NY | 0 | — |
| 15 | George | SJ | — | — |
| 20 | Bob | NY | 10 | T1 |
| 40 | Mohan | NY | 30 | T1 |

Refresh of SINKSJ
Time of refresh = T2
Last Refresh of SINKSJ = T0

| | Base Table Before Refresh | | | | | Base Table After Refresh | | | |
|---|---|---|---|---|---|---|---|---|---|
| addr | NAME | LOC | PREV | TIME | | NAME | LOC | PREV | TIME |
| 10 | Bruce | SJ | 0 | T1 | →→→ | Bruce | SJ | 0 | T1 |
| | TC1 → Xmit(<Bruce,SJ>, 10, 0) | | | | | | | | |
| 20 | Bob | NY | 10 | T1 | →→→ | Bob | NY | 10 | T1 |
| 30 | Laura | SJ | 20 | T1 | →→→ | Laura | SJ | 20 | T1 |
| | TC1 → Xmit(<Laura,SJ>, 30, 10) | | | | | | | | |
| 40 | Mohan | NY | 30 | T1 | →→→ | Mohan | NY | 30 | T1 |
| | TC3 → Xmit(←,→, -, 30) | | | | | | | | |

| SINKSJ Before Refresh | | | | SINKSJ After Refresh | | |
|---|---|---|---|---|---|---|
| NAME | LOC | ADDR | | NAME | LOC | ADDR |
| | | | Recv(<Bruce,SJ>, 10, 0) | | | |
| — | — | — | → CS3 → | Bruce | SJ | 10 |
| | | | Recv(<Laura,SJ>, 30, 10) | | | |
| — | — | — | → CS3 → | Laura | SJ | 30 |
| | | | Recv(←,→, -, 30) | | | |

Next, let the base table be updated as follows:
Update Bruce at 10 to have LOC=NY
Insert George at 15 with LOC=SJ
Delete Laura at 30

Next, let the SINKALL table be updated at time T3 using the differential refresh method. The previous refresh time for the SINKALL table is T1.

Refresh of SINKALL
Time of refresh = T3
Last Refresh of SINKALL = T1

| | Base Table Before Refresh | | | | | Base Table After Refresh | | | |
|---|---|---|---|---|---|---|---|---|---|
| addr | NAME | LOC | PREV | TIME | | NAME | LOC | PREV | TIME |
| 10 | Bruce | NY | 0 | — | →SU4→ | Bruce | SJ | 0 | T3 |
| | TC1 → Xmit(<Bruce,NY>, 10, 0) | | | | | | | | |
| 15 | George | SJ | — | — | →SU1→ | George | SJ | 10 | T3 |
| | TC1 → Xmit(<George,SJ>, 15, 10) | | | | | | | | |
| 20 | Bob | NY | 10 | T1 | →SU3→ | Bob | NY | 15 | T1 |
| 40 | Mohan | NY | 30 | T1 | →SU2→ | Mohan | NY | 20 | T3 |
| | TC2 & TC3 → Xmit(<Mohan,NY>, 40, 20) | | | | | | | | |

| SINKALL Before Refresh | | | | SINKALL After Refresh | | |
|---|---|---|---|---|---|---|
| NAME | LOC | ADDR | | NAME | LOC | ADDR |
| | | | Recv(<Bruce,NY>, 10, 0) | | | |
| Bruce | SJ | 10 | → CS2 → | Bruce | NY | 10 |
| | | | Recv(<George,SJ>, 15, 10) | | | |
| — | — | — | → CS3 → | George | SJ | 15 |

-continued

| | | | | | | |
|---|---|---|---|---|---|---|
| Bob | NY | 20 | →→→ | Bob | NY | 20 |
| | | | Recv(<Mohan,NY>, 40, 20) | | | |
| Laura | SJ | 30 | → CS1 → | — | — | — |
| Mohan | NY | 40 | →→→ | Mohan | NY | 40 |

Next, let the SINKSJ table be updated using the differential refresh method. The time of the refresh will be T4 while the time of last refresh for SINKSJ is T2.

Refresh of SINKSJ
Time of refresh = T4
Last Refresh of SINKSJ = T2

| | Base Table Before Refresh | | | | | Base Table After Refresh | | | |
|---|---|---|---|---|---|---|---|---|---|
| addr | NAME | LOC | PREV | TIME | | NAME | LOC | PREV | TIME |
| 10 | Bruce | NY | 0 | T3 | →→→ | Bruce | NY | 0 | T3 |
| 15 | George | SJ | 10 | T3 | →→→ | George | SJ | 10 | T3 |
| | | | | TC1 → Xmit (<George,SJ>, 15, 0) | | | | | |
| 20 | Bob | NY | 15 | T1 | →→→ | Bob | NY | 15 | T1 |
| 40 | Mohan | NY | 20 | T3 | → SU2 → | Mohan | NY | 20 | T3 |
| | | | | TC3 → Xmit(←,→, -, 15) | | | | | |

| SINKSJ Before Refresh | | | | SINKSJ After Refresh | | |
|---|---|---|---|---|---|---|
| NAME | LOC | ADDR | | NAME | LOC | ADDR |
| | | | Recv(<George,SJ>, 15, 0) | | | |
| Bruce | SJ | 10 | → CS1 → | — | — | — |
| — | — | — | → CS3 → | George | SJ | 15 |
| | | | Recv(←,→, -, 15) | | | |
| Laura | SJ | 30 | → CS3 → | — | — | — |

Next, let the base table be updated as follows:
Delete Bruce at 10
Insert Paul at 10 with LOC=SJ
Delete Bob at 20
Insert Guy at 17 with LOC=NY
Insert Ron at 30 with LOC=SJ
The contents of the base table will now be as follows:

Base Table at time T5

| addr | NAME | LOC | PREV | TIME |
|---|---|---|---|---|
| 10 | Paul | SJ | — | — |
| 15 | George | SJ | 10 | T3 |
| 17 | Guy | NY | — | — |
| 30 | Ron | SJ | — | — |
| 40 | Mohan | NY | 20 | T3 |

This time let the SINKSJ table be updated first using the differential refresh method. The time of the refresh will be T5 while the time of last refresh for SINKSJ is T4.

Refresh of SINKSJ
Time of refresh = T5
Last Refresh of SINKSJ = T4

| | Base Table Before Refresh | | | | | Base Table After Refresh | | | |
|---|---|---|---|---|---|---|---|---|---|
| addr | NAME | LOC | PREV | TIME | | NAME | LOC | PREV | TIME |
| 10 | Paul | SJ | — | — | → SU1 → | Paul | SJ | 0 | T5 |
| | | | | TC1 → Xmit(<Paul,SJ>, 10, 0) | | | | | |
| 15 | George | SJ | 10 | T3 | →→→ | George | SJ | 10 | T3 |
| 17 | Guy | NY | — | — | → SU1 → | Guy | NY | 15 | T5 |
| 30 | Ron | SJ | — | — | → SU1 → | Ron | SJ | 17 | T5 |
| | | | | TC1 & TC2 → Xmit(<Ron,SJ>, 30, 15) | | | | | |
| 40 | Mohan | NY | 20 | T3 | → SU2 & SU3 → | Mohan | NY | 30 | T5 |
| | | | | TC3 → Xmit(←,→, -, 30) | | | | | |

| SINKSJ Before Refresh | | | | SINKSJ After Refresh | | |
|---|---|---|---|---|---|---|
| NAME | LOC | ADDR | | NAME | LOC | ADDR |
| | | | Recv(<Paul,SJ>, 10, 0) | | | |
| — | — | — | → CS3 → | Paul | SJ | 10 |
| George | SJ | 15 | →→→ | George | SJ | 15 |
| | | | Recv(<Ron,SJ>, 30, 15) | | | |
| — | — | — | → CS3 → | Ron | SJ | 30 |
| | | | Recv(←,→, -, 30) | | | |

Next, let the SINKALL table be updated at time T6 using the differential refresh method. The previous refresh time for the SINKALL table is T3.

Refresh of SINKALL
Time of refresh = T6

-continued

Last Refresh of SINKALL = T3

| | Base Table Before Refresh | | | | | Base Table After Refresh | | | |
|---|---|---|---|---|---|---|---|---|---|
| addr | NAME | LOC | PREV | TIME | | NAME | LOC | PREV | TIME |
| 10 | Paul | SJ | 0 | T5 | →→→ | Paul | SJ | 0 | T5 |
| | | | | TC1 → Xmit(<Paul,SJ>, 10, 0) | | | | | |
| 15 | George | SJ | 10 | T3 | →→→ | George | SJ | 10 | T3 |
| 17 | Guy | NY | 15 | T5 | →→→ | Guy | NY | 15 | T5 |
| | | | | TC1 → Xmit(<Guy,NY>, 17, 15) | | | | | |
| 30 | Ron | SJ | 17 | T5 | →→→ | Ron | SJ | 17 | T5 |
| | | | | TC1 → Xmit(<Ron,SJ>, 30, 17) | | | | | |
| 40 | Mohan | NY | 30 | T5 | →→→ | Mohan | NY | 30 | T5 |
| | | | | TC1 & TC3 → Xmit(<Mohan,NY>, 40, 30) | | | | | |

| SINKALL Before Refresh | | | | SINKALL After Refresh | | |
|---|---|---|---|---|---|---|
| NAME | LOC | ADDR | | NAME | LOC | ADDR |
| | | Recv(<Paul,SJ>, 10, 0) | | | | |
| Bruce | NY | 10 | → CS2 → | Paul | SJ | 10 |
| George | SJ | 15 | →→→ | George | SJ | 15 |
| | | Recv(<Guy,NY>, 17, 15) | | | | |
| — | — | — | → CS3 → | Guy | NY | 17 |
| | | Recv(<Ron,SJ>, 30, 17) | | | | |
| Bob | NY | 20 | → CS1 → | — | — | — |
| — | — | — | → CS3 → | Ron | SJ | 30 |
| | | Recv(<Mohan,NY>, 40, 30) | | | | |
| Mohan | NY | 40 | →→→ | Mohan | NY | 40 |

Advantages of the Method

While the invention is particularly described with reference to a preferred embodiment, it should be appreciated that its departure from the prior art resides in its utilization of only a minimal amount of information in order to refresh the snapshot tables. Further, the method minimizes the number of table changes. Thus, a tuple is transmitted only if the tuple has been updated, inserted, or if the tuple follows one or more deleted tuples in the base table. This has the further consequence of minimizing the amount of logging of changes in addition to reduced message size and change number to the snapshot tables. Yet another aspect of the method is that normal non-refresh actions, on both the snapshot and base tables incur little or no computing resource overhead. That is, for instance, there is no overhead for snapshot read, or for read, insert, or delete on the base table. Likewise, updates on the base table need only write one extra field.

This refresh method exploits efficient access paths on the snapshot and base tables during the refresh operation. At the base table, a sequential scan of the relation, i.e. in TID order, can be used to isolate the changes for the snapshot copy. At the snapshot, either a clustered link or clustering index on BASE TID permits access to the needed records of the snapshot during refresh. If the portion of the snapshot to be updated by each refresh is small, a clustered index is advantageous.

The method, as described, also suggests the maintenance of multiple snapshot tables, derived from the same source table. The cost of maintenance of the source table control fields is amortized over the multiple dependent snapshots. Updates to the control fields, while refreshing one snapshot, need not be repeated to refresh a second snapshot. Also, the method allows the contents of each snapshot table to be a different subset of the base table.

Having thus described the invention, what is claimed as new and desired to secure the Letters Patent is:

1. A method for updating an extensible multicolumn table (snapshot table) which is a subset of a logically independent extensible multicolumn table (base table) in a nodal network of a distributed relational data base system, each row entry of the base table being assigned a unique identifier, said data base system having local means for generating time stamps in ascending order upon demand, said method comprising the steps of:

(a) defining on the base table a partial ordering of time stamps on the row updates (insertions, deletions, modifications), a total ordering of row entry identifiers, and a backward chaining of the identifiers of adjacent row entries;
   (b) scanning the base table and detecting changes thereto as anomalies to the orderings or chaining; and
   (c) communicating the anomalies to the snapshot table and altering its contents therewith.

2. In a distributed relational data base facility having an extensible multicolumn table (base table), a second and logically separate multicolumn table forming an operative subset of the base table (snapshot table), and means for generating time stamps (TS) in ascending order upon demand, each row entry of the base table being assigned a unique identifier (TID), a method for updating the entries in the snapshot table, comprising the steps of:

(a) defining column extensions to the base table such that each row entry includes an identifier (PREVTID) of the prior adjacent entry in row major order and a TS value corresponding to the last alteration of the entry, said extensions constituting a total ordering of row entries by TID, a partial ordering by TS values, and a backward chaining by PREVTID;
   (b) defining column extensions to the snapshot table such that each row entry includes TID, and associating with the snapshot table the highest valued TS recorded in the base table; and
   (c) responsive to a request to update the snapshot table, the further steps of:
      (1) scanning the base table in ascending TID order and detecting incremental changes (row insertion, deletion, modification) thereto manifested by changes in orderings or backward chaining, and
      (2) communicating and applying the detected changes to the snapshot table by way of a skip sequential pass in ascending TID order.

3. A method according to claim 2, wherein in communicating and applying the detected changes to the snapshot table by way of a skip sequential pass in ascending TID order, said skip sequential pass being modified to utilize either a clustered link or clustering index.

* * * * *